United States Patent
Vega et al.

(10) Patent No.: US 11,254,230 B1
(45) Date of Patent: Feb. 22, 2022

(54) TELESCOPING ACTUATOR

(71) Applicant: Mod.al, Draper, UT (US)

(72) Inventors: Erick Vega, Salt Lake City, UT (US); Preston Ruff, Draper, UT (US); Kreg Peeler, Draper, UT (US)

(73) Assignee: Mod.al, Draper, UT (US)

( * ) Notice: Subject to any disclaimer, the term of this patent is extended or adjusted under 35 U.S.C. 154(b) by 0 days.

(21) Appl. No.: 17/377,041

(22) Filed: Jul. 15, 2021

(51) Int. Cl.
| | |
|---|---|
| *H02J 7/00* | (2006.01) |
| *H02J 7/14* | (2006.01) |
| *B60L 53/35* | (2019.01) |
| *B60L 53/16* | (2019.01) |
| *B60L 53/18* | (2019.01) |

(52) U.S. Cl.
CPC ............... *B60L 53/35* (2019.02); *B60L 53/16* (2019.02); *B60L 53/18* (2019.02)

(58) Field of Classification Search
USPC .......................................................... 320/109
See application file for complete search history.

(56) References Cited

U.S. PATENT DOCUMENTS

| | | | | | |
|---|---|---|---|---|---|
| 4,657,220 | A * | 4/1987 | Lindsay | ............... | B66F 11/048 248/647 |
| 4,907,768 | A * | 3/1990 | Masseron | ............. | B66F 11/048 212/197 |
| 5,306,999 | A * | 4/1994 | Hoffman | ................. | B60L 53/31 320/109 |
| 5,462,439 | A * | 10/1995 | Keith | ..................... | G07F 15/005 320/109 |
| 5,617,003 | A * | 4/1997 | Odachi | .................... | B60L 53/60 320/108 |
| 5,654,621 | A * | 8/1997 | Seelig | ..................... | H02J 7/025 320/108 |
| 5,697,757 | A * | 12/1997 | Lindsay | ............... | B66F 11/048 212/197 |
| 5,821,731 | A * | 10/1998 | Kuki | ...................... | B60L 53/31 320/108 |
| 8,473,131 | B2 * | 6/2013 | Leary | ..................... | B60L 53/35 701/22 |
| 8,890,475 | B1 * | 11/2014 | Becker | .................... | B60L 53/35 320/109 |
| 2012/0286730 | A1 * | 11/2012 | Bonny | ................... | B60L 53/35 320/109 |
| 2013/0076902 | A1 * | 3/2013 | Gao | .................... | H01R 13/6683 348/148 |
| 2013/0338820 | A1 * | 12/2013 | Corbett | .................. | B60L 53/35 700/232 |
| 2014/0125134 | A1 * | 5/2014 | Van Straten | ............. | F03D 9/11 307/72 |
| 2014/0217977 | A1 * | 8/2014 | Pastoor | .................. | B60L 53/35 320/109 |
| 2015/0306974 | A1 * | 10/2015 | Mardall | ............. | H01M 10/656 320/150 |

(Continued)

*Primary Examiner* — Alexis B Pacheco
(74) *Attorney, Agent, or Firm* — Kirton McConkie; Brian Tucker

(57) ABSTRACT

A telescoping actuator may be used with a charging station or other solution. The telescoping actuator can include a telescoping assembly that is hollow to thereby facilitate running wires or cables through the telescoping assembly. The telescoping actuator may also include a pulley system that enables the telescoping assembly to be extended and retracted without unduly occupying the hollow interior of the telescoping assembly.

25 Claims, 14 Drawing Sheets

(56) References Cited

U.S. PATENT DOCUMENTS

| | | | |
|---|---|---|---|
| 2016/0207406 A1* | 7/2016 | Kauffmann | B60L 53/124 |
| 2017/0166070 A1* | 6/2017 | Dunger | B60L 53/11 |
| 2018/0105050 A1* | 4/2018 | Hengel | B60L 53/18 |
| 2018/0226750 A1* | 8/2018 | Widegren | H01R 13/6315 |
| 2020/0324661 A1* | 10/2020 | Freeling-Wilkinson | B60L 53/31 |
| 2021/0053456 A1* | 2/2021 | Freeling-Wilkinson | B60L 53/31 |

* cited by examiner

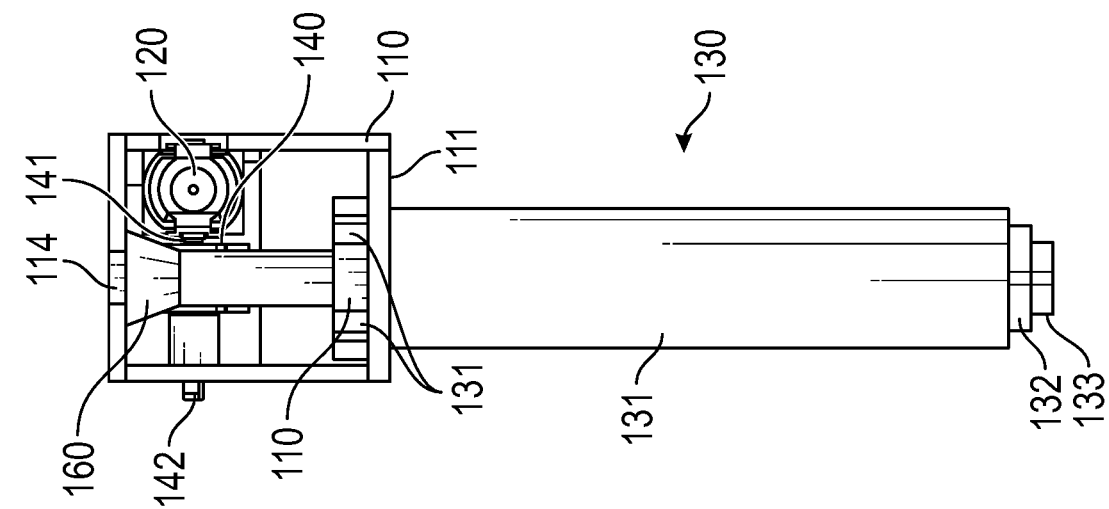
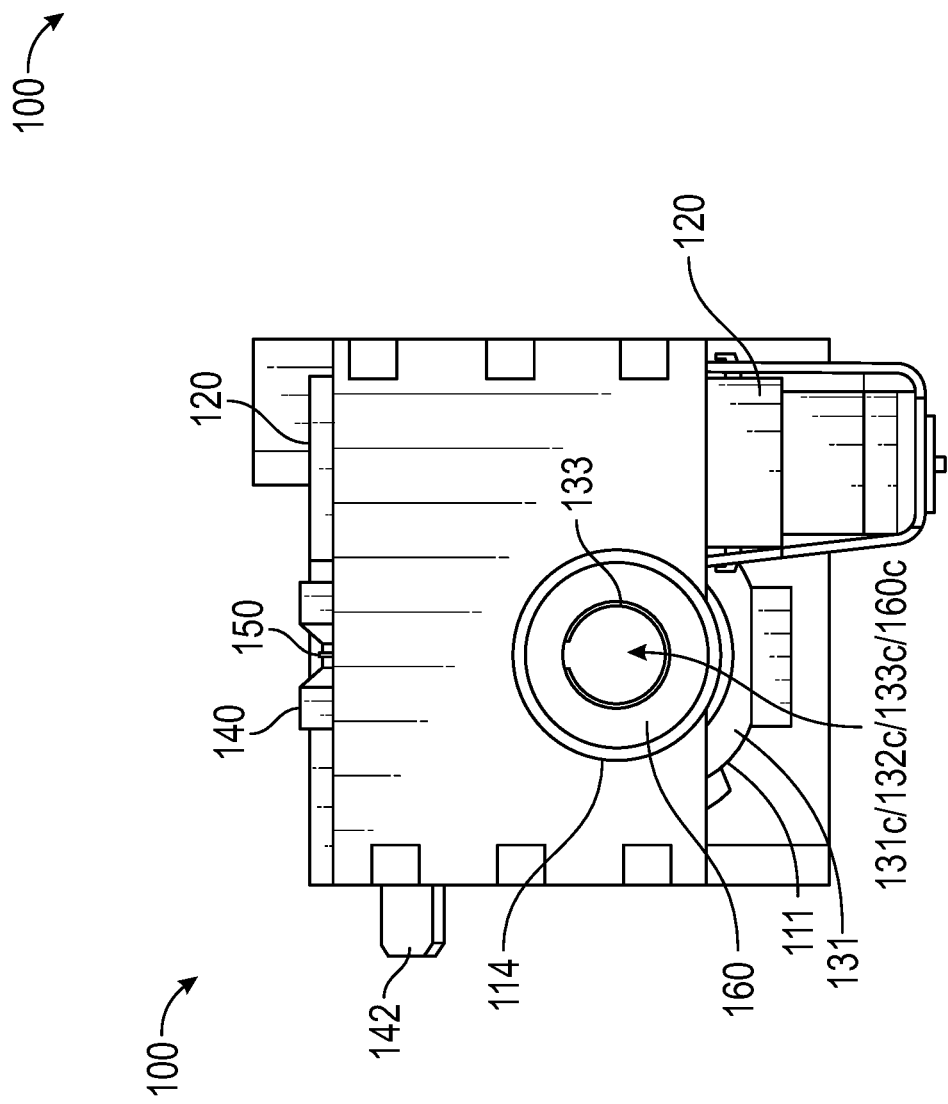
FIG. 1D
FIG. 1C

TELESCOPING ACTUATOR

CROSS-REFERENCE TO RELATED APPLICATIONS

N/A

BACKGROUND

Electrical vehicles (or EVs), whether cars, trucks or otherwise, must be frequently recharged. For this purpose, an EV typically has a charging port that is located on the side of the vehicle. In such cases, to charge the EV, a driver must exit the EV and plug a cord into the charging port.

Some attempts have been made to develop automated charging solutions. For example, some solutions employ a robotic arm that plugs the charging cord into the charging port. These solutions are bulky, expensive and obstruct the pathway around the EV. Other solutions employ induction to wirelessly charge the EV. Such solutions are complex and often require significant structural investments/modifications such as embedding an inductive plate in the concrete, asphalt or other base material. Wireless solutions are also incapable of performing level 3 "rapid" charging.

Because of such complexities, cost and limitations, automated charging solutions have not been widely adopted. Instead, the vast majority of EV owners simply plug in their EVs just like any other electronic device.

BRIEF SUMMARY

The present invention extends to a telescoping actuator that may be used with a charging station or other solution. The telescoping actuator can include a telescoping assembly that is hollow to thereby facilitate running wires or cables through the telescoping assembly. The telescoping actuator may also include a pulley system that enables the telescoping assembly to be extended and retracted without unduly occupying the hollow interior of the telescoping assembly.

In some embodiments, the present invention may be implemented as a telescoping actuator that includes an enclosure housing a motor and a telescoping assembly that extends from the enclosure. The telescoping assembly may include a plurality of segments, each having a hollow interior. The motor may be configured to cause the plurality of segments to extend and retract.

In some embodiments, the motor may be a DC motor.

In some embodiments, each of the plurality of segments may have a first end and a second end and the hollow interior may extend between the first end and the second end.

In some embodiments, the telescoping actuator may also include a pulley and a wire. When the motor drives the pulley, the wire may cause the telescoping assembly to extend or retract.

In some embodiments, the plurality of segments may include a plurality of pins around which the wire is routed.

In some embodiments, the plurality of segments may include an outer segment and the plurality of pins may include a first pin that is positioned at a first end of the outer segment. The wire may extend from the pulley and around the first pin.

In some embodiments, the plurality of segments may include an intermediate segment and the plurality of pins may include a second pin that is positioned at a second end of the intermediate segment. The wire may extend from the first pin and around the second pin.

In some embodiments, the plurality of pins may include a third pin that is positioned at a first end of the intermediate segment. The wire may extend from the second pin, through a channel in the intermediate segment and around the third pin.

In some embodiments, the plurality of segments may include an inner segment and a first end of the wire may be secured to a second end of the inner segment.

In some embodiments, a second end of the wire may extend from the pulley through the hollow interiors of the outer segment and the intermediate segment and may be secured to a second end of the inner segment.

In some embodiments, the telescoping assembly may include one or more additional intermediate segments.

In some embodiments, the plurality of segments may each include a channel within which the wire is routed.

In some embodiments, the telescoping actuator may include one or more wires that extend through the hollow interior of the plurality of segments.

In some embodiments, the telescoping actuator may include a plug that is coupled to an inner segment of the plurality of segments. The plug may have one or more electrical contacts to which the one or more wires are connected.

In some embodiments, the telescoping actuator may include a funnel through which the one or more wires extend.

In some embodiments, the plurality of segments may include conductive material that forms an electrical connection between adjacent segments of the plurality of segments.

In some embodiments, the present invention may be implemented as a telescoping actuator for establishing an electrical connection between a vehicle and a charging station. The telescoping actuator may include an enclosure that is configured to be secured underneath a vehicle, a telescoping assembly that is oriented downwardly from the enclosure and a plug coupled to the telescoping assembly.

In some embodiments, the telescoping actuator may include one or more wires that extend within the telescoping assembly from one or more electrical contacts on the plug.

In some embodiments, the telescoping actuator may include a DC motor for causing the telescoping assembly to extend and retract.

In some embodiments, the present invention may be implemented as a telescoping actuator that includes an enclosure housing a motor and a pulley and a telescoping assembly that extends from the enclosure. The telescoping assembly may include a plurality of segments including an outer segment, one or more intermediate segments and an inner segment. The telescoping actuator may also include a wire that is routed around the pulley and a plurality of pins that are positioned on the plurality of segments. When the pulley is rotated, the wire causes the plurality of segments to extend or retract.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 1A-1D are side perspective, cross-sectional side perspective, top and side views respectively of a telescoping actuator that is configured in accordance with one or more embodiments of the present invention when the telescoping actuator is in a retracted position;

DETAILED DESCRIPTION

A telescoping actuator configured in accordance with one or more embodiments of the present invention may be used with a charging station or other power delivery solution to facilitate the automatic and intelligent establishment of an electrical connection with a vehicle's power and/or electrical/control system. A telescoping actuator configured in accordance with one or more embodiments of the present invention may also be used with any other solution where selective extension of a component is desired.

Figure 1A:
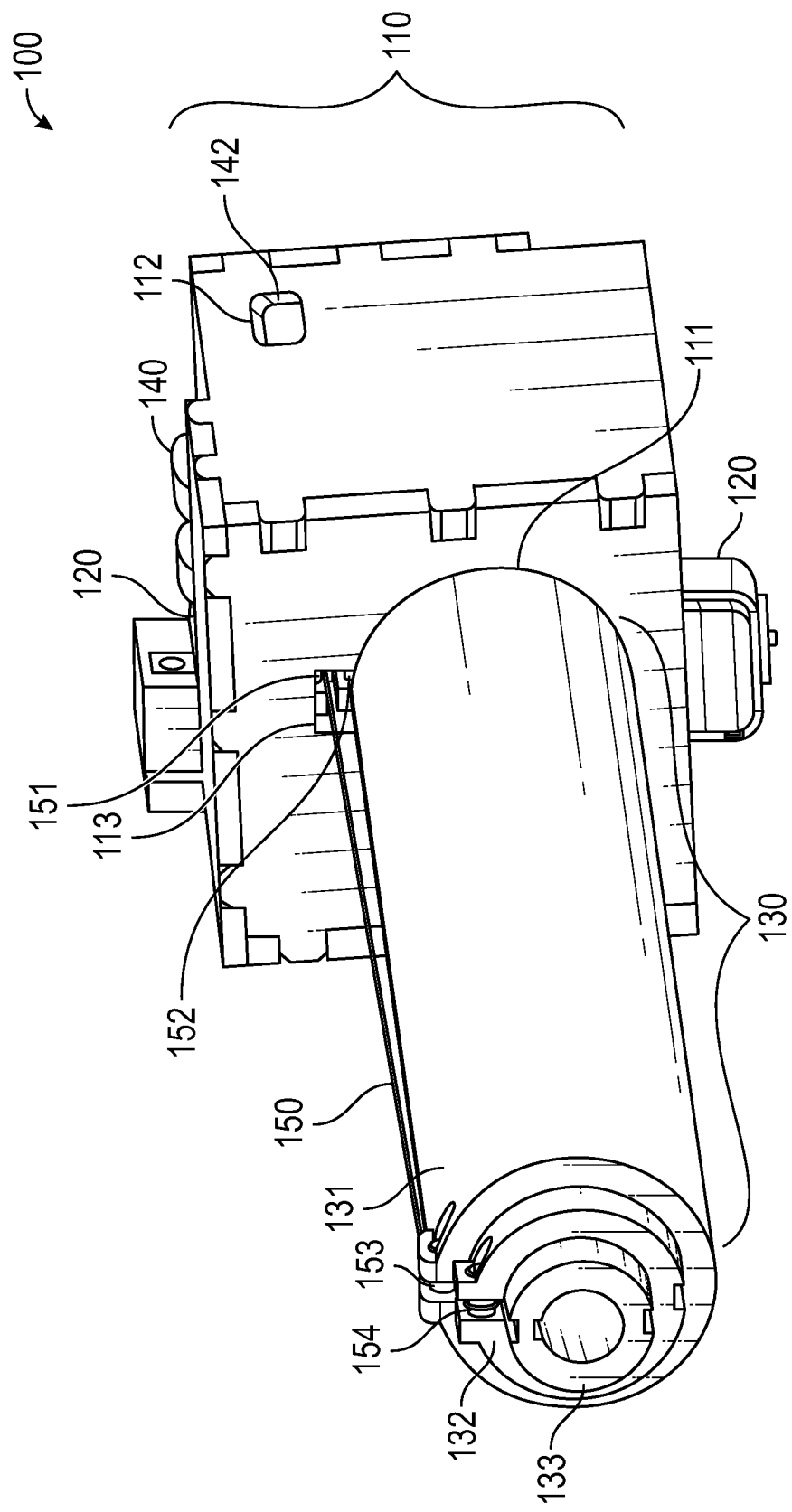
Figure 1B:
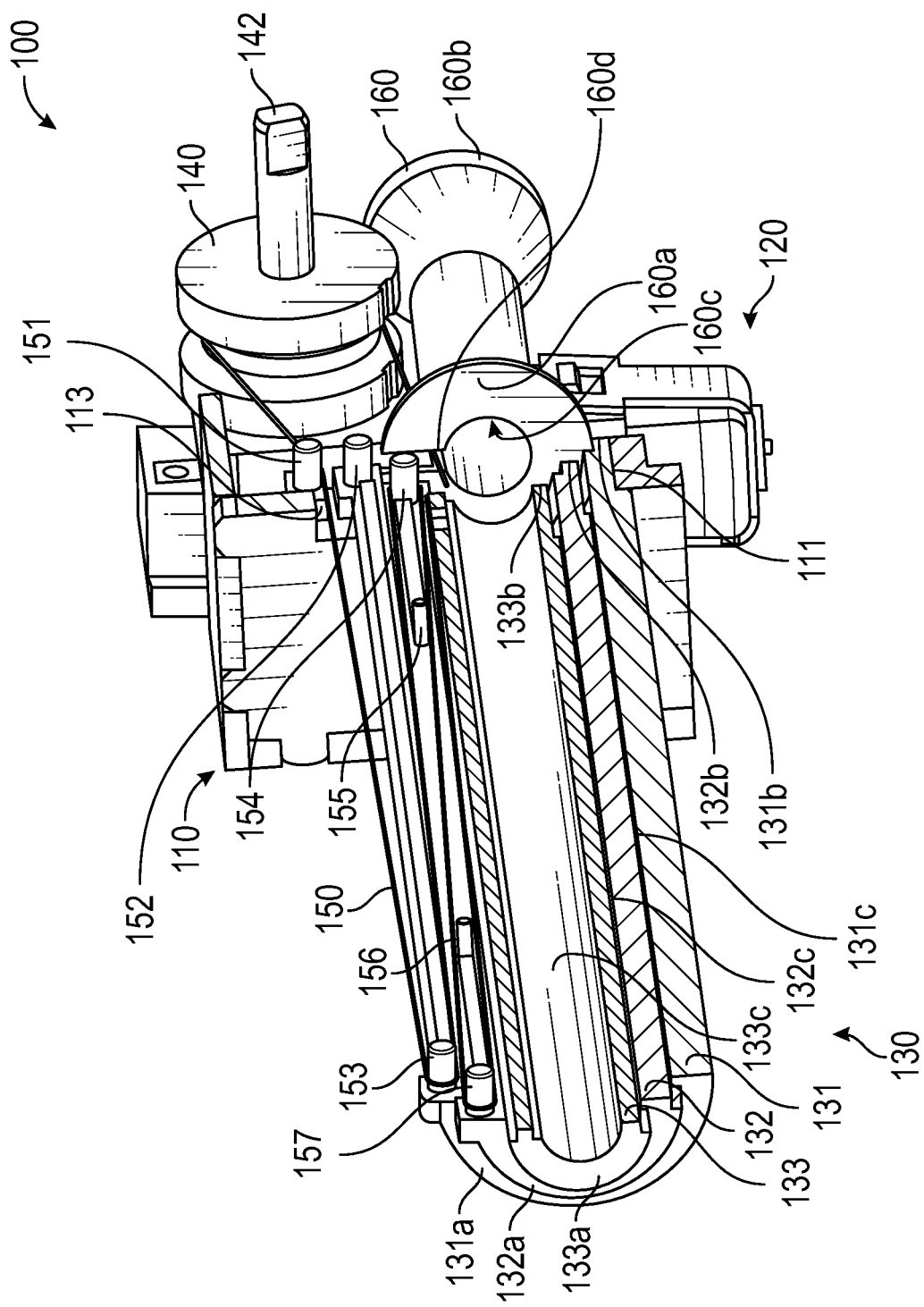
Figure 2A:
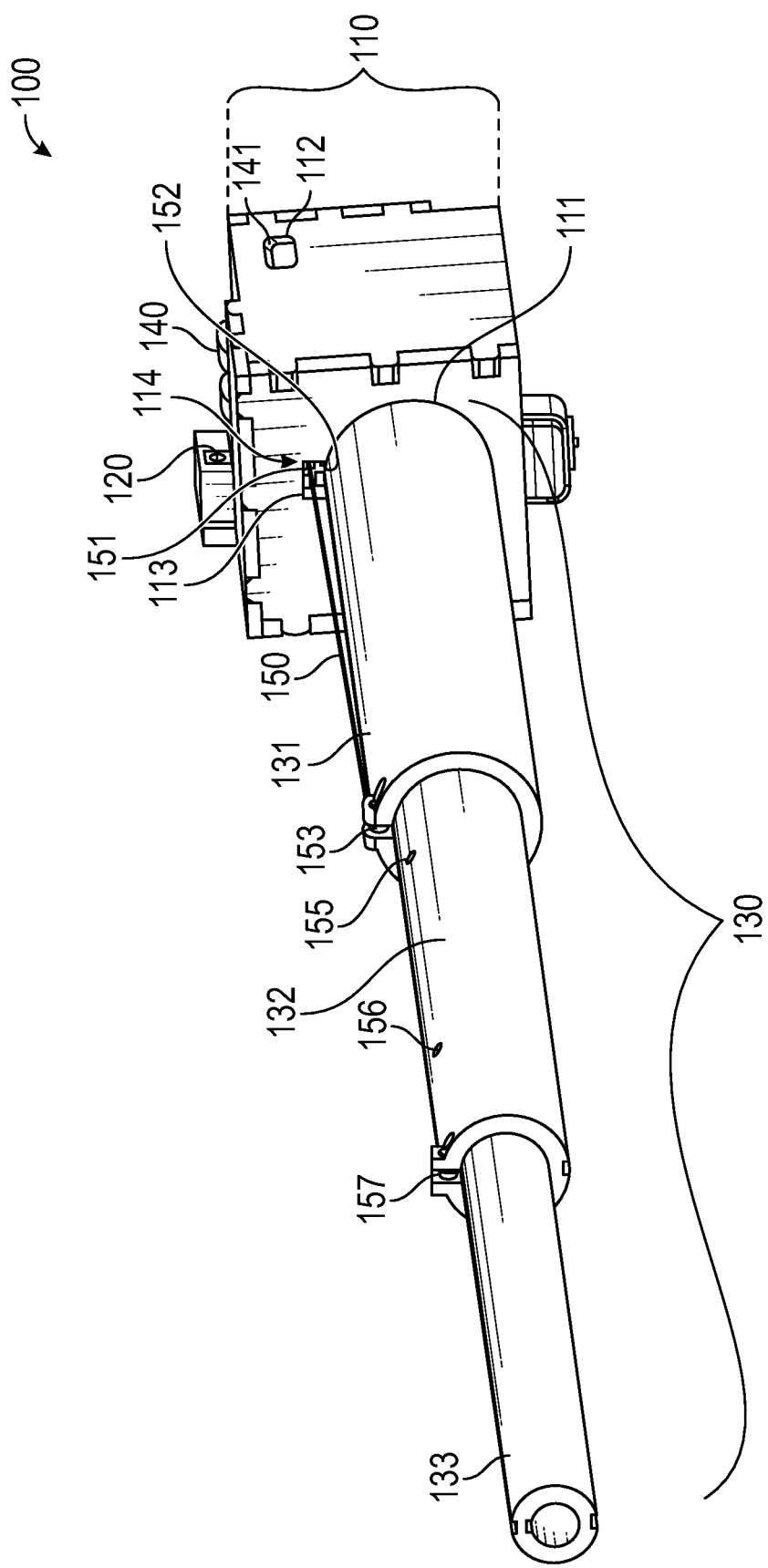
FIGS. 2A and 2B are side perspective and cross-sectional side perspective views of the telescoping actuator in an extended position.
Figure 2B:
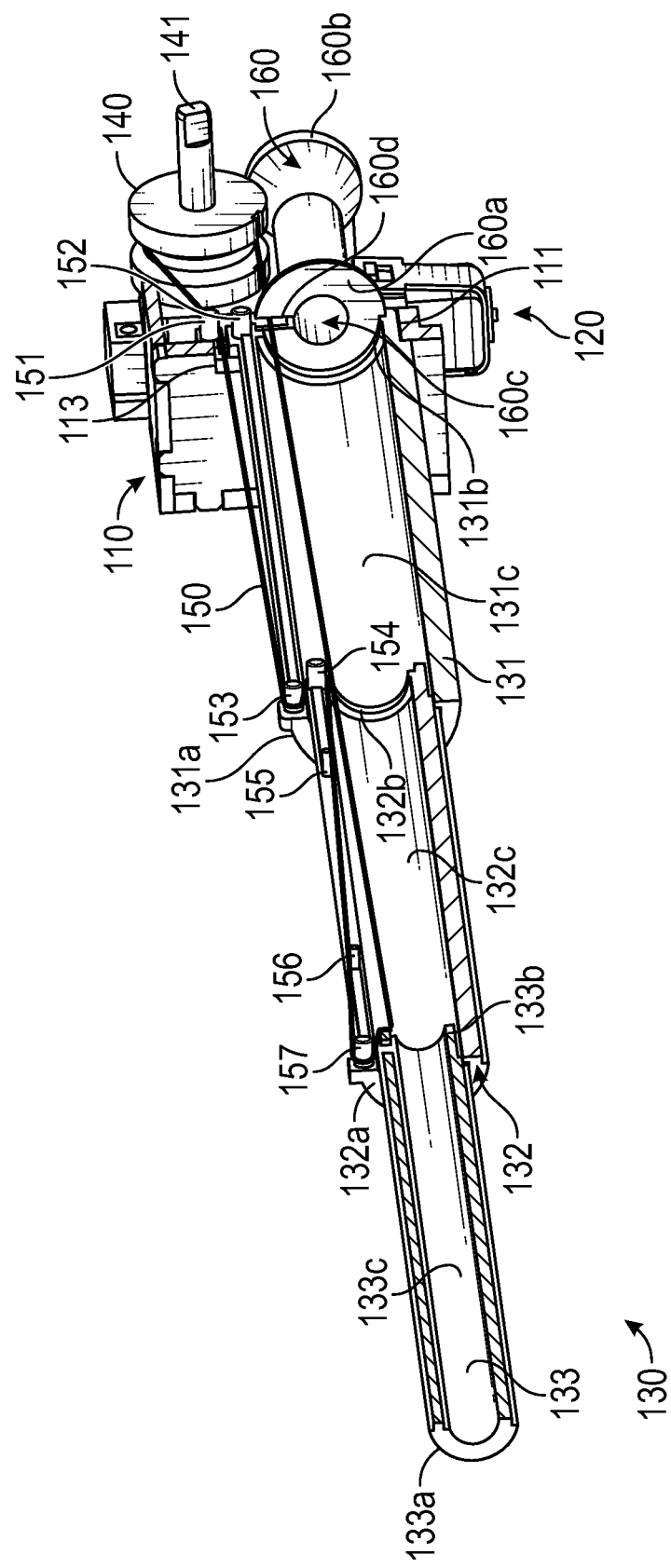
Figure 3A:
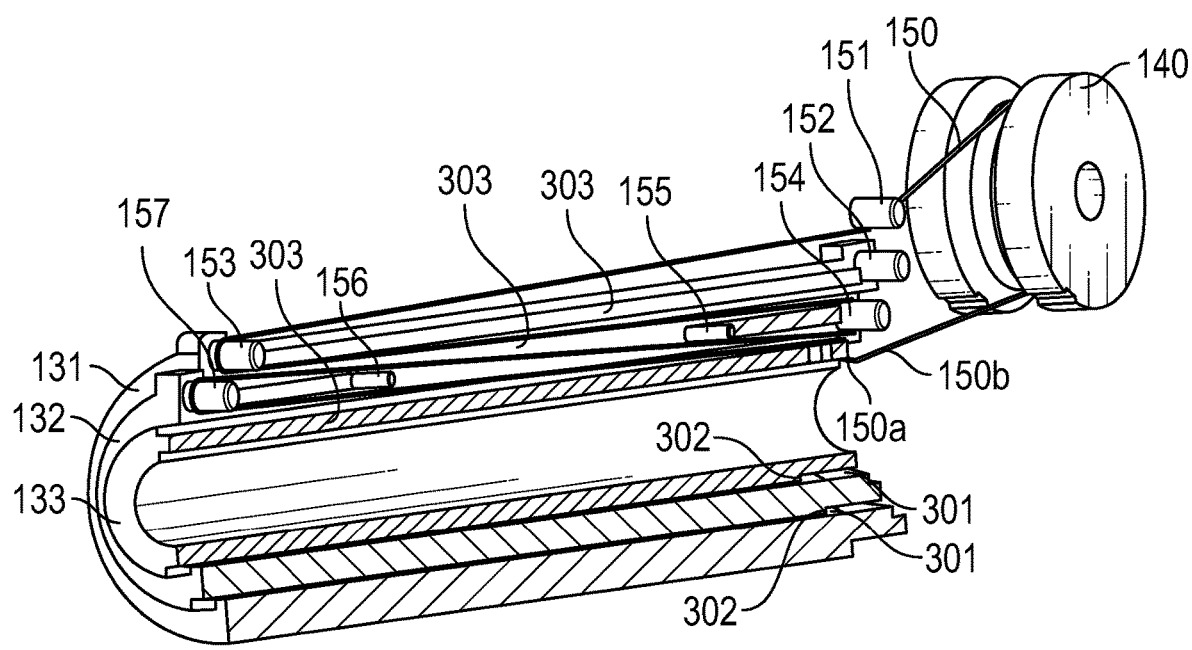
FIG. 3A is a cross-sectional side perspective view of a telescoping assembly of the telescoping actuator in the retracted position.
Figure 3B:
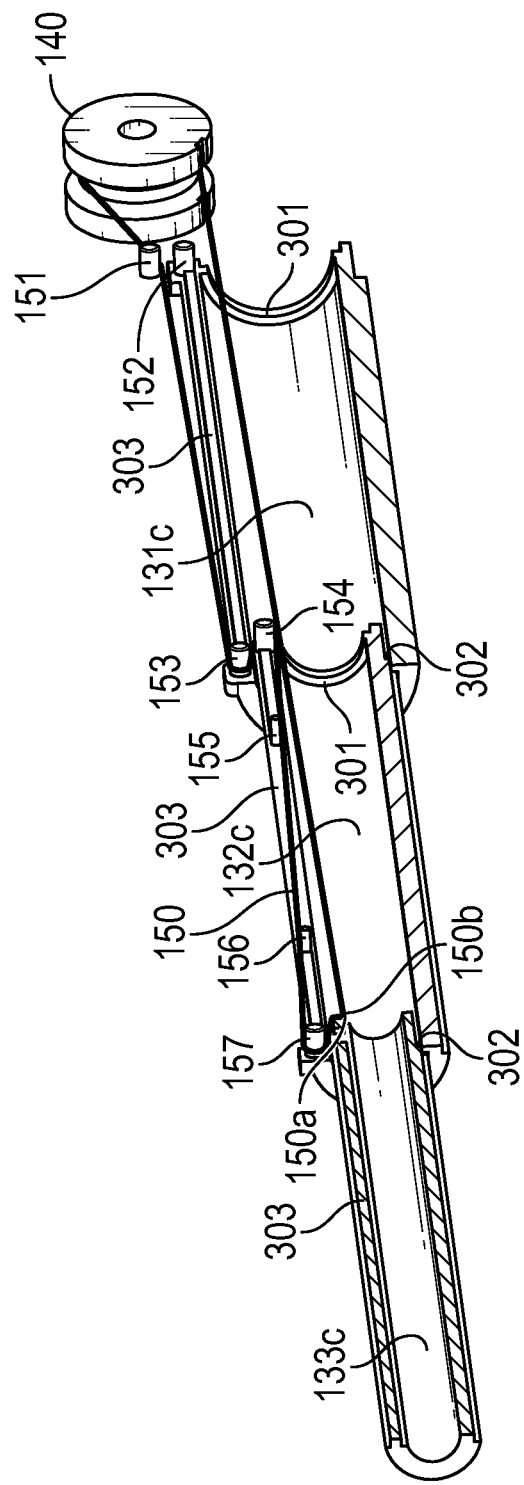
FIG. 3B is a cross-sectional side perspective view of the telescoping assembly of the telescoping actuator in the extended position.
Figure 3C:
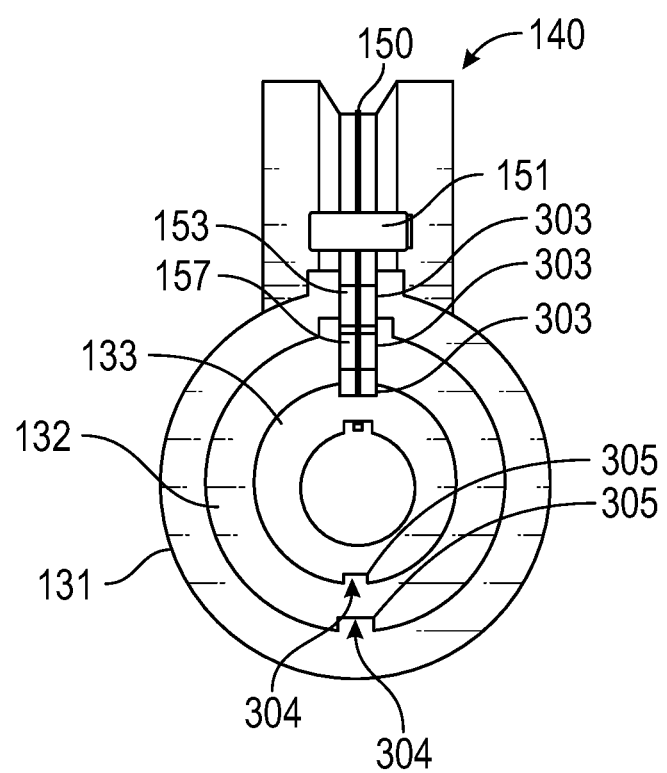
FIG. 3C is a bottom view of the telescoping assembly of the telescoping actuator.

FIGS. 1A-3C provide various views of a telescoping actuator 100 that is configured in accordance with one or more embodiments of the present invention. FIGS. 1A-1D show telescoping actuator 100 in a retracted position, while FIGS. 2A and 2B show telescoping actuator 100 in an extended position. FIGS. 3A-3C are different views of a telescoping assembly 130 and other components of telescoping actuator 100 in isolation.

Telescoping assembly 100 includes an enclosure 110 from which telescoping assembly 130 extends and which houses a motor 120, a pulley 140 and a funnel 160. Pulley 140 can be positioned on a shaft 141 that motor 120 drives to cause pulley 140 to rotate and can also be supported by a shaft 142 that extends from an opposite side of enclosure 110 and is supported within an opening 112. Alternatively, shaft 142 could be omitted and shaft 141 could extend fully through opening 112. Pulley 140 can be used to drive a wire 150 that is configured to extend and retract telescoping assembly 130. In addition to its standard meaning, the term "wire" should be construed as encompassing any elongated material that is capable of performing the functionality described herein such as a chain, cable, etc.

In some embodiments, motor 120 may be positioned to one side of telescoping assembly 130 so that pulley 140 can be positioned in-line with telescoping assembly 130 (i.e., to cause wire 150 to run parallel with telescoping assembly 130). Motor 120 may preferably be a DC motor, but other types of motors could be used.

Enclosure 110 may include an opening 111 within which telescoping assembly 130 is supported by and secured to enclosure 110. Enclosure 110 may also include an opening 114 opposite opening 111. Funnel 160 can have a generally cylindrical shape with a first end 160a, a second end 160b and a hollow interior 160c extending between first end 160a and second end 160b. Funnel 160 can be positioned within enclosure 110 so that first end 160a is adjacent to and axially aligned with opening 111 and second end 160b is positioned within opening 114. In some embodiments, funnel 160 can function as a conduit for electrical wires or cables that extend from telescoping assembly 130. Hollow interior 160c may be flared at second end 160b to provide a transition for such wires or cables.

Telescoping assembly 130 is shown as including three segments 131-133. However, a telescoping assembly of a telescoping actuator configured in accordance with one or more embodiments of the present invention may include any reasonable number of segments. Segment 131 is the outer segment and has a first end 131a, a second end 131b that extends into opening 111 and a hollow interior 131c that extends between first end 131a and second 131b. Segment 132 is an intermediate segment and has a first end 132a, a second end 132b and a hollow interior 132c that extends between first end 132a and second 132b. Segment 133 is the inner segment and has a first end 133a, a second end 133b and a hollow interior 133c that extends between first end 133a and second 133b. Segments 131-133 may have any suitable length and their lengths need not be the same or similar.

As best seen in FIG. 1B, when telescoping assembly 130 is in the retracted position, second ends 131b, 132b and 133b may be proximate one another. In some embodiments, second ends 131b, 132b and 133b may be positioned within opening 111 when retracted. As best seen in FIG. 2B, when telescoping assembly 130 is in the extended position, second end 132b can be proximate first end 131a and second end 133b can be proximate first end 132a. Hollow interiors 131c, 132c and 133c of segments 131-133 respectively can be axially aligned with hollow interior 160c of funnel 160.

Telescoping assembly 130 may include a number of pins 151-157 that are configured to route wire 150 in a manner that will cause telescoping assembly 130 to move between the retracted and extended positions when pulley 140 is rotated. Pins 151-157 may be oriented in alignment with pulley 140 (i.e., along the same plane). Pins 151 and 152 may be positioned within enclosure 110 on opposing sides of a notch 113 in enclosure 110 through which wire 150 extends and may function to prevent wire 150 from contacting the edges of notch 113. Pin 153 may be positioned at first end 131a of segment 131. Pin 154 may be positioned at second end 132b of segment 132, pin 157 may be positioned at first end 132a of segment 132 and pins 155 and 156 may be positioned between pins 153 and 157.

Wire 150 may have a first end 150a and a second end 150b that are fixed to second end 133b of segment 133 (or whichever segment may be the innermost in an embodiment with a different number of segments). From second end 150b, wire 150 can be routed within hollow interiors 132c and 131c, through a notch 160d in funnel 160, around pulley 140, between pins 151 and 152 and through notch 113, along the exterior of segment 113, around pin 153, along the exterior of segment 132, around pin 154, through second end 132b and into hollow exterior 132c, under pin 155, through channel 303 in segment 132, over pin 156, around pin 157, along the exterior of segment 133 to first end 150a which is fixed to second end 133b.

To enable this routing of wire 150, channels 303 may be formed in each segment 131, 132 and 133 across which the respective pins 153-157 may span. In the case of segment 132, and particularly because segment 132 is an intermediate segment, channel 303 may extend fully through the sidewall of segment 132 so that wire 150 may be routed from within hollow interior 132c through the sidewall. If there is more than one intermediate segment in a telescoping assembly, each intermediate segment may have pins 154-157 and a channel 303 that extends fully through the sidewall of the intermediate segment to enable wire 150 to be routed in this manner. Notably, this routing of wire 150 within channels 303 formed along the exterior of segments 131-133 minimizes the length of wire 150 that is within hollow interiors 131c-133c thereby freeing the hollow interiors for running electrical wires.

Due to this routing, the length of wire 150 that extends between pulley 140 and first end 150a is greatest when telescoping assembly 130 is in the retracted position and shortest when telescoping assembly 130 is in the extended position. With reference to the orientation of telescoping assembly 130 in FIGS. 3A and 3B, when pulley 140 is rotated in a clockwise direction while telescoping assembly 130 is in the retracted position, wire 150 will pull on pin 154 thereby causing segment 132 to extend. Similarly, this clockwise rotation of pulley 140 will cause wire 150 to pull on second end 133b thereby causing segment 133 to extend. Then, when pulley 140 is rotated in a counterclockwise direction, second end 150b of wire 150 will pull on second end 133b thereby causing segment 133 to retract into segment 132 until ridge 302 of segment 133 contacts ridge 301 of segment 132. At that point, the pulling force that wire 150 exerts will cause segment 133 and segment 132 to retract into segment 131 until ridge 302 of segment 132 contacts ridge 301 of segment 131.

In some embodiments, pulley 140 can be a v-groove pulley that enhances the friction between wire 150 and pulley 140. This friction can enable wire 150 to be rotated until telescoping assembly 130 is fully extended or fully retracted at which point wire 150 may slip relative to pulley 140 to prevent excessive force or overextension and overretraction. In some embodiments, wire 150 may be wrapped around pulley twice to increase the amount of friction. In some embodiments, enclosure 110 may include a tensioner (not shown) to tension wire 150 to create the desired amount of friction.

In some embodiments, segments 131-133 can be keyed to prevent relative rotation. For example, as best shown in FIG. 3C, segments 132 and 133 may include a groove 305 and segments 131 and 132 may have corresponding protrusions 304 that insert into grooves 305.

Telescoping assembly 130 can be formed of any suitable material. For example, segments 311-313 could be formed of injection plastics or machined metals to suit a particular application, environment, stiffness or precision requirement. In some embodiments, pins 151-157 may be made of metal to minimize the amount of friction between pins 151-157 and wire 150. In some embodiments, wire 150 could be formed of a metal or metal alloy such as Nitinol.

In some embodiments, telescoping assembly 100 could include an encoder or other mechanism for detecting and controlling the extension and retraction of telescoping assembly 130. For example, wire 150 could be routed around a shaft of a rotary encoder that is positioned within enclosure 110.

Figure 4A:
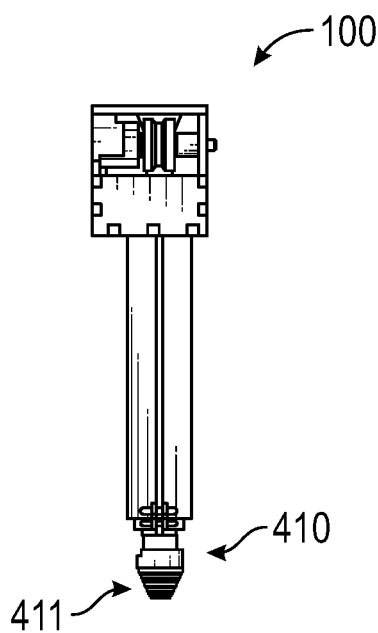
FIGS. 4A and 4B provide an example of how the telescoping actuator can be used to electrically connect a plug and a receiver.
Figure 4B:
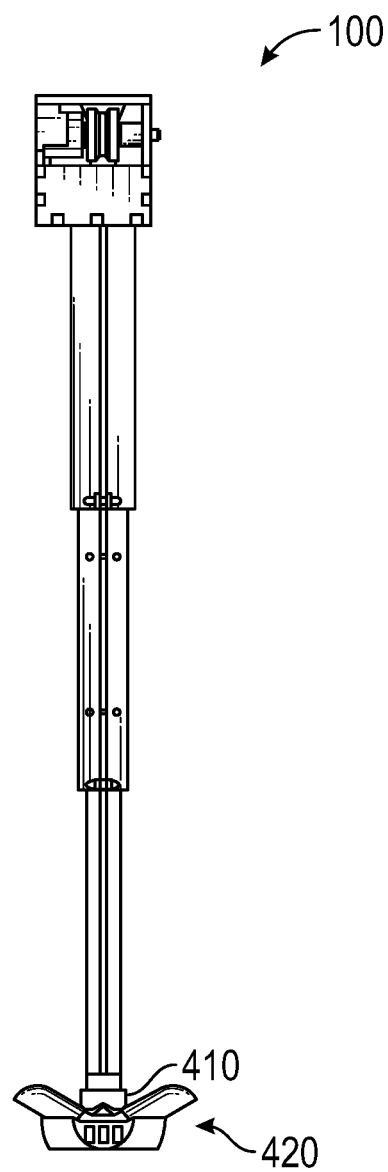

FIGS. 4A and 4B provide an example of how telescoping actuator 100 may be used to establish one or more electrical connections. For example, telescoping actuator 100 may be used on a vehicle to connect the vehicle's power and/or data/control system to a charging station as described in U.S. patent application Ser. No. 17/351,983 which is incorporated herein by reference. As shown, a plug 410 may be secured to first end 133a of segment 133. Plug 410 may include a number of electrical contacts 411. When a receiver 420 is positioned below telescoping actuator 100, motor 120 may be driven to cause telescoping assembly 130 to extend thereby lowering plug 410 towards and into receiver 420. Receiver 420 may include electrical contacts corresponding to electrical contacts 411. Examples of how receiver 420 could be configured are provided in U.S. patent application Ser. No. 17/369,615 which is incorporated herein by reference. When plug 410 is inserted into receiver 420, one or more electrical connections can be created. These electrical connections can be used to deliver power and/or data as appropriate for a given scenario.

Figure 5:
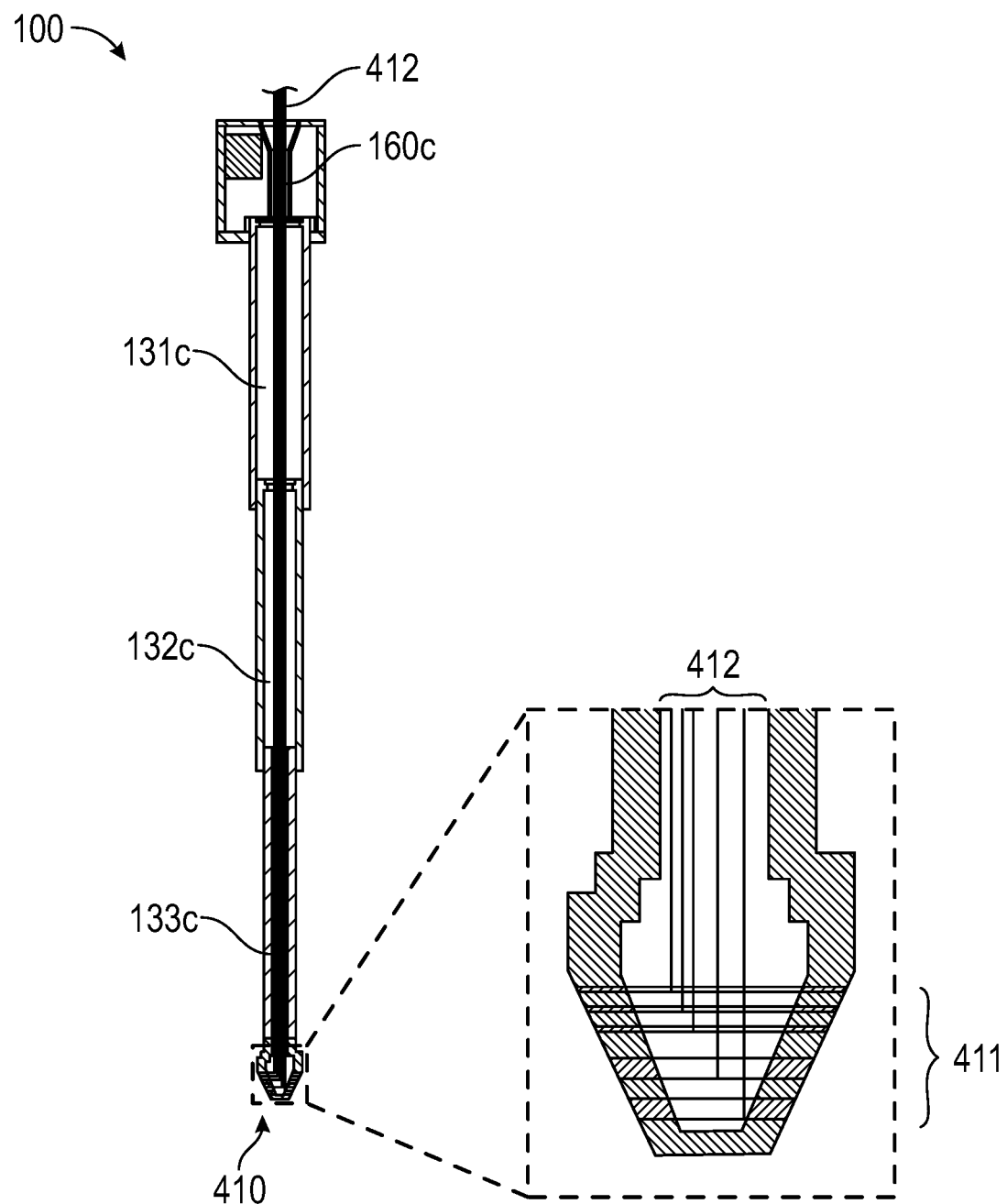
FIG. 5 is a cross-sectional side view of the telescoping actuator with a plug and wires extending through the telescoping assembly.

FIG. 5 provides an example of how electrical wires or cables can be routed within telescoping assembly 130 in one or more embodiments of the present invention. In FIG. 5, plug 410 is connected to segment 133 and telescoping assembly 130 is shown in the extended position. A number of wires 412 extend through hollow interior 160c of funnel 160 and hollow interiors 131c-133c of segments 131-133 respectively. Wires 412 can be electrically connected to electrical connectors 411. In embodiments where telescoping actuator 110 is used on electric vehicles, some of wires 412 could be electrically connected to the vehicle's power system to enable a charging station, to which receiver 420 may be connected, to charge the vehicle's battery. Additionally or alternatively, some of wires 412 could be electrically connected to the vehicle's control system to enable a data connection to be established between the charging station and the control system.

Figure 6:
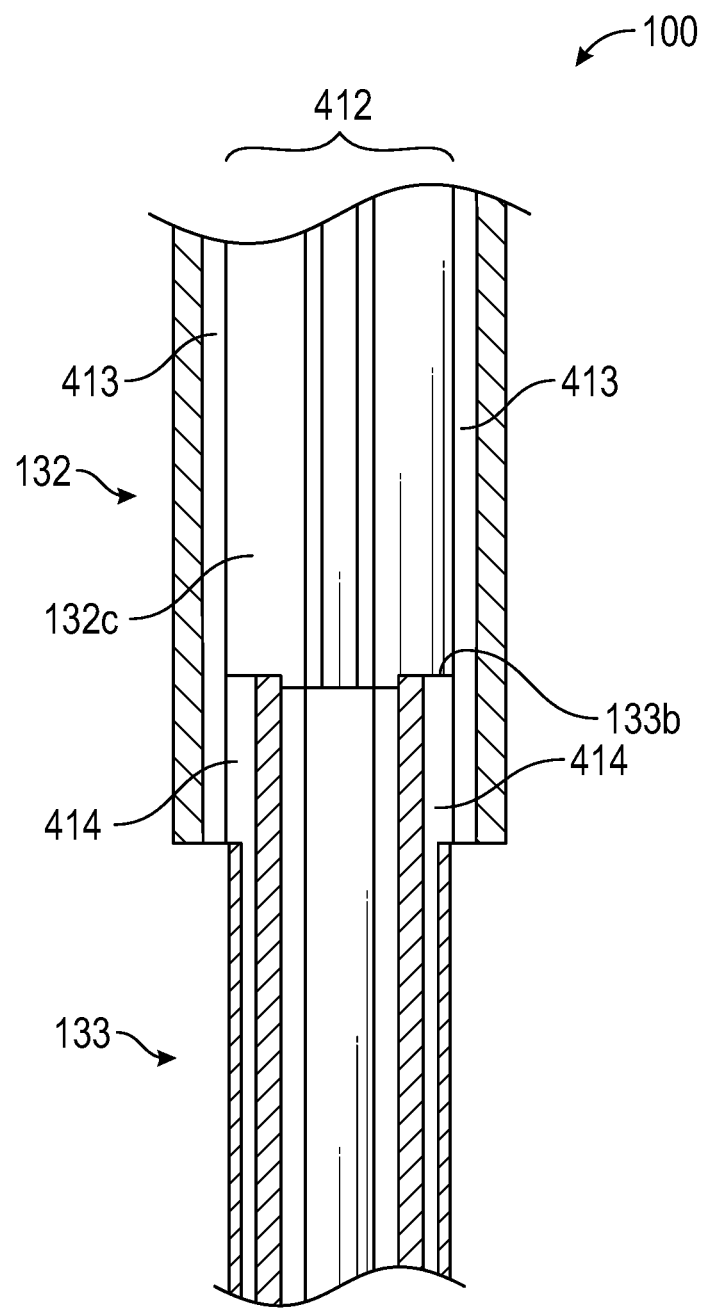
FIG. 6 is a cross-sectional side view of a portion of the telescoping assembly when it includes leads for forming an electrical connection.

In some embodiments, conductive material may be embedded into segments 131-133 to enable power to be delivered through segments 131-133 without the use of wires. For example, FIG. 6 shows two lengths of conductive material 413 that line the sidewall of hollow interior 132c of segment 132 and two lengths of conductive material 414 that are embedded within the sidewall of segment 133 and surface at second end 133b to contact conductive material 413. In some embodiments, conductive material 413, 414 could be connected to contacts 411 that are used for power and wires 412 may be used to form a data connection. A similar arrangement of conductive material could also be used in segment 131 to form a connection with conductive material 413. In such cases, wires could be connected to the conductive material in segment 131 (e.g., at second end 131b) at routed through funnel 160.

Figure 8:
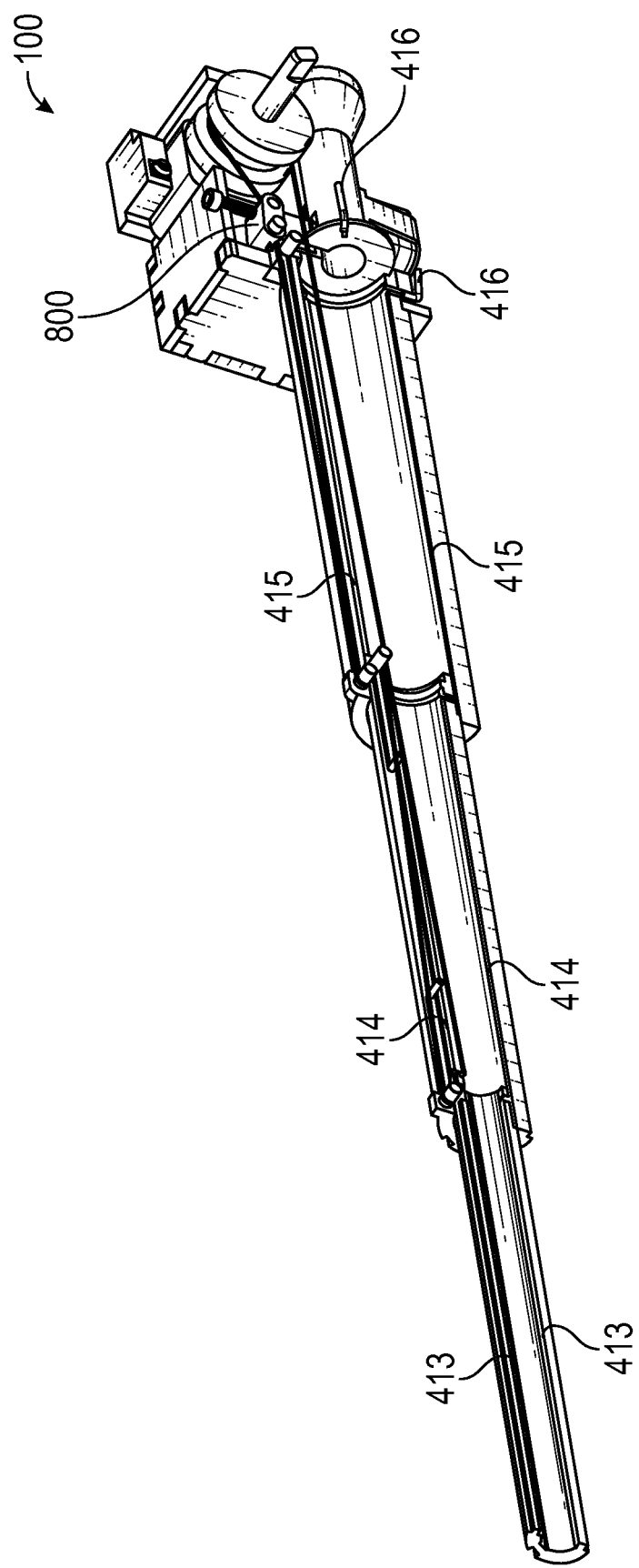
FIG. 8 is a cross-sectional side perspective view of the telescoping actuator with a tensioner and embedded conductive material.

FIG. 8 provides an example of how conductive material 413-415 can extend along segments 131-133 and connect to wires 416 that are routed through enclosure 110. FIG. 8 also provides an example of how a tensioner 800 may be used to tension wire 150.

Figure 7A:
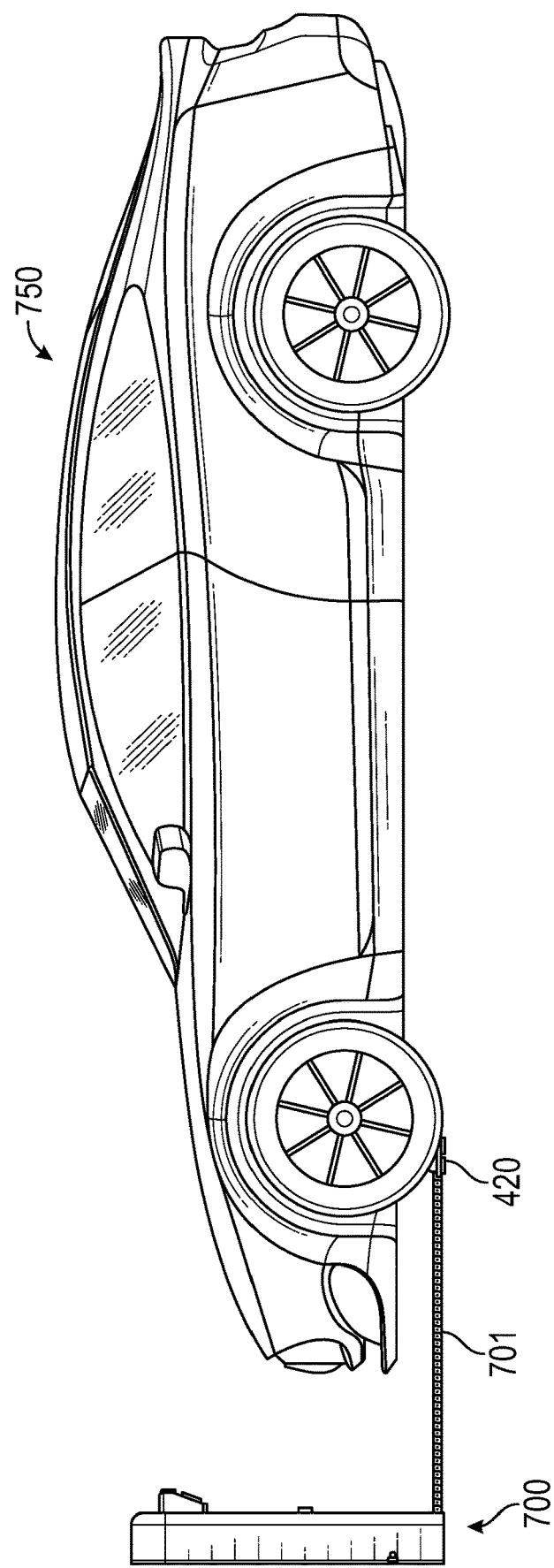
FIGS. 7A and 7B provide an example of how the telescoping actuator may be used on an electric vehicle to automatically connect the electric vehicle's power and/or data system to a charging station.
Figure 7B:
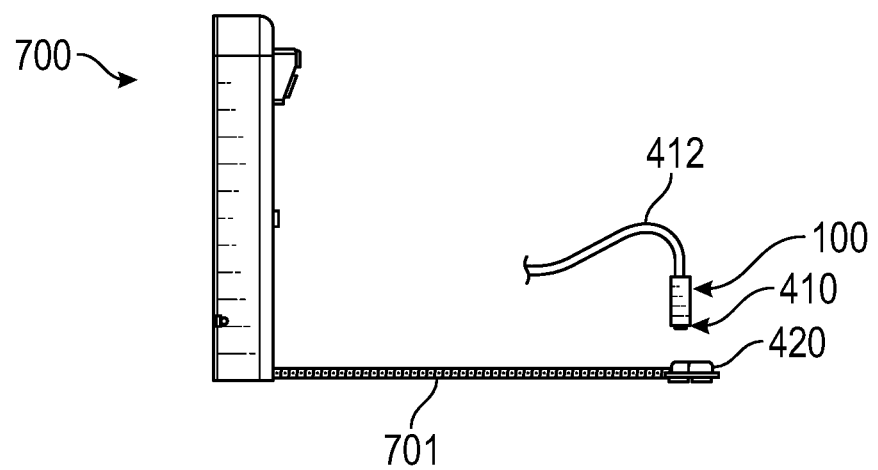

FIG. 7A provides an example of how telescoping actuator 100 may be used on an electric vehicle 750 to allow electric vehicle 750 to be automatically and intelligently connected to charging station 700. In FIG. 7B, electric vehicle 750 is removed to reveal how telescoping actuator 100 may be positioned and oriented on electric vehicle 750. Charging station 700 may include an extender 701 to which receiver 420 is connected and may be configured to detect the position of vehicle 750 relative to charging station 700 and the position of telescoping actuator 100 relative to receiver 420. As such, charging station 700 may maneuver receiver 420 to position it below telescoping actuator 100. In some embodiments, after or while positioning receiver 420 below telescoping assembly 100, charging station 700 may be configured to cause motor 120 to extend telescoping assembly 130 until plug 410 inserts into receiver 420. Then, charging station 700 may deliver power to and/or communicate with electric vehicle 750 via receiver 420 and telescoping actuator 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A telescoping actuator for establishing an electrical connection between a vehicle and a charging station comprising:
    an enclosure housing a motor, the enclosure being configured to mount to an underside of the vehicle; and
    a telescoping assembly that extends from the enclosure when the enclosure is mounted to the underside of the vehicle, the telescoping assembly including a plurality of segments including a first segment that is mounted to the enclosure, each of the plurality of segments having a hollow interior, wherein the motor is configured to cause the plurality of segments to extend and retract thereby enabling the plurality of segments to be selectively extended from the underside of the vehicle while the first segment remains mounted to the enclosure that is mounted to the underside of the vehicle to a receiver positioned under the vehicle to form the electrical connection.

2. The telescoping actuator of claim 1, wherein the motor is a DC motor.

3. The telescoping actuator of claim 1, wherein each of the plurality of segments has a first end and a second end, and wherein the hollow interior extends between the first end and the second end.

4. The telescoping actuator of claim 1, further comprising:
    a pulley; and
    a wire;
    wherein, when the motor drives the pulley, the wire causes the telescoping assembly to extend or retract.

5. The telescoping actuator of claim 4, wherein the plurality of segments include a plurality of pins around which the wire is routed.

6. The telescoping actuator of claim 5, wherein the first segment is an outer segment, and wherein the plurality of pins include a first pin that is positioned at a first end of the outer segment, the wire extending from the pulley and around the first pin.

7. The telescoping actuator of claim 6, wherein the plurality of segments include an intermediate segment, and wherein the plurality of pins include a second pin that is positioned at a second end of the intermediate segment, the wire extending from the first pin and around the second pin.

8. The telescoping actuator of claim 7, wherein the plurality of pins include a third pin that is positioned at a first end of the intermediate segment, the wire extending from the second pin, through a channel in the intermediate segment and around the third pin.

9. The telescoping actuator of claim 8, wherein the plurality of segments include an inner segment, and wherein a first end of the wire is secured to a second end of the inner segment.

10. The telescoping actuator of claim 9, wherein a second end of the wire extends from the pulley through the hollow interiors of the outer segment and the intermediate segment and is secured to a second end of the inner segment.

11. The telescoping actuator of claim 10, wherein the telescoping assembly includes one or more additional intermediate segments.

12. The telescoping actuator of claim 5, wherein the plurality of segments each include a channel within which the wire is routed.

13. The telescoping actuator of claim 1, further comprising:
    one or more wires that extend through the hollow interior of the plurality of segments.

14. The telescoping actuator of claim 13, further comprising:
    a plug that is coupled to an inner segment of the plurality of segments, the plug having one or more electrical contacts to which the one or more wires are connected.

15. The telescoping actuator of claim 13, further comprising:
    a funnel through which the one or more wires extend.

16. The telescoping actuator of claim 1, wherein the plurality of segments include conductive material that forms an electrical connection between adjacent segments of the plurality of segments.

17. A telescoping actuator for establishing an electrical connection between a vehicle and a charging station, the telescoping actuator comprising:
    an enclosure that is configured to be secured to an underside of a vehicle;
    a telescoping assembly that is mounted to and oriented downwardly from the enclosure when the enclosure is mounted to the underside of the vehicle thereby enabling the telescoping assembly to be selectively extended from the enclosure that is mounted to the underside of the vehicle to a receiver positioned under the vehicle, the telescoping assembly including an outer segment that is mounted to the enclosure, an inner segment, and zero or more intermediate segments between the outer segment and the inner segment; and
    a plug coupled to the inner segment of the of the telescoping assembly, the plug being configured to form the electrical connection with the receiver positioned under the vehicle while the outer segment remains mounted to the enclosure that is mounted to the underside of the vehicle.

18. The telescoping actuator of claim 17, further comprising:
    one or more wires that extend within the telescoping assembly from one or more electrical contacts on the plug.

19. The telescoping actuator of claim 17, further comprising:
    a DC motor for causing the telescoping assembly to extend and retract.

20. A telescoping actuator comprising:
    an enclosure housing a motor and a pulley, the enclosure being configured to mount to an underside of the vehicle;

a telescoping assembly that extends from the enclosure when the enclosure is mounted to the underside of the vehicle, the telescoping assembly comprising a plurality of segments including an outer segment that is mounted to the enclosure, one or more intermediate segments and an inner segment; and a wire that is routed around the pulley and a plurality of pins that are positioned on the plurality of segments, wherein, when the pulley is rotated, the wire causes the plurality of segments to extend or retract thereby enabling the telescoping assembly to be selectively extended from the underside of the vehicle while the outer segment remains mounted to the enclosure that is mounted to the underside of the vehicle to a receiver positioned under the vehicle to form an electrical connection.

21. A telescoping actuator comprising:

an enclosure housing a motor;

a telescoping assembly that extends from the enclosure, the telescoping assembly including a plurality of segments, each having a hollow interior, wherein the motor is configured to cause the plurality of segments to extend and retract;

a pulley; and a wire;

wherein, when the motor drives the pulley, the wire causes the telescoping assembly to extend or retract;

wherein the plurality of segments include a plurality of pins around which the wire is routed;

wherein the plurality of segments include an outer segment, and wherein the plurality of pins include a first pin that is positioned at a first end of the outer segment, the wire extending from the pulley and around the first pin;

wherein the plurality of segments include an intermediate segment, and wherein the plurality of pins include a second pin that is positioned at a second end of the intermediate segment, the wire extending from the first pin and around the second pin;

wherein the plurality of pins include a third pin that is positioned at a first end of the intermediate segment, the wire extending from the second pin, through a channel in the intermediate segment and around the third pin.

22. The telescoping actuator of claim 21, wherein the plurality of segments include an inner segment, and wherein a first end of the wire is secured to a second end of the inner segment.

23. The telescoping actuator of claim 22, wherein a second end of the wire extends from the pulley through the hollow interiors of the outer segment and the intermediate segment and is secured to a second end of the inner segment.

24. The telescoping actuator of claim 23, wherein the telescoping assembly includes one or more additional intermediate segments.

25. A telescoping actuator comprising:

an enclosure housing a motor;

a telescoping assembly that extends from the enclosure, the telescoping assembly including a plurality of segments, each having a hollow interior, wherein the motor is configured to cause the plurality of segments to extend and retract;

a pulley; and a wire;

wherein, when the motor drives the pulley, the wire causes the telescoping assembly to extend or retract;

wherein the plurality of segments include a plurality of pins around which the wire is routed;

wherein the plurality of segments each include a channel within which the wire is routed.

* * * * *